Nov. 19, 1946.  B. P. BAKER ET AL  2,411,356
VALVE MECHANISM FOR COMPRESSED GAS CIRCUIT INTERRUPTERS
Filed March 13, 1943  2 Sheets-Sheet 2

INVENTORS
Benjamin P. Baker
and Herbert J. Webb.
BY
Ralph H. Swingle
ATTORNEY

Patented Nov. 19, 1946

2,411,356

UNITED STATES PATENT OFFICE 2,411,356

VALVE MECHANISM FOR COMPRESSED GAS CIRCUIT INTERRUPTERS

Benjamin P. Baker, Turtle Creek, and Herbert J. Webb, Forest Hills, Pa., assignors to Westinghouse Electric Corporation, East Pittsburgh, Pa., a corporation of Pennsylvania Application March 13, 1943, Serial No. 479,066

10 Claims. (Cl. 137—139)

The invention relates, generally, to compressed gas circuit interrupters and, more particularly, to a valve mechanism for controlling the flow of compressed gas to the circuit interrupter.

In compressed gas circuit interrupters, it is desirable that the valves operate quickly in response to the operation of the control electromagnets and relays, particularly the blast valve which controls the flow of compressed gas to extinguish the arc drawn by the interrupting contacts. The control of the blast valve is usually closely coordinated with the contact movement, and it is important that this valve should not only open quickly but should remain open only so long as is necessary for the current arc to be extinguished and should then close very quickly upon deenergization of its control relay in order to prevent wastage of compressed gas. The rate of consumption of compressed gas for each pole unit of some gas blast circuit breakers is five or more cubic feet of free gas per $1/60$ of a second, and unless the blast valves close quickly as soon as the control relay is deenergized, a considerable quantity of compressed gas will be wasted.

The operating forces used to effect high speed movement of the valve to open and closed position are relatively large, and since the available control energy is usually small, it is desirable that the force required to initiate operation of the valve mechanism should be kept small.

An object of the invention is the provision of a compressed gas circuit interrupter with an improved high speed valve mechanism which will open and close very quickly in response to energization and deenergization of the control device therefor.

Another object of the invention is the provision of an improved valve mechanism for a fluid circuit interrupter, which is operated at very high speed to valve open and to valve closed positions by a relatively large force and yet which requires only a relatively small control force to initiate operation of the valve.

Another object of the invention is the provision of an improved high speed valve mechanism operated by a compressed gas motor to which a relatively large quantity of compressed gas is quickly admitted for effecting high speed operation of the motor and main valve by a compressed gas operated relay valve that is, in turn, controlled by a pilot valve.

Another object of the invention is the provision of an improved valve mechanism embodying a fluid operated piston to which fluid under pressure is admitted for effecting opening of the valve and having a by-pass connection which automatically directs fluid under pressure to the opposite side of the piston at the end of the operating stroke to insure quick closing of the valve.

Another object of the invention is the provision of an improved valve mechanism embodying a fluid motor operating means to which fluid under pressure is admitted by a relay valve that also functions to quickly exhaust the fluid pressure in the motor upon closing of the relay valve.

Another object of the invention is the provision of a compressed gas circuit interrupter with an improved high speed valve mechanism that is very simple, reliable and quick in operation, and economical to manufacture.

The novel features that are considered characteristic of the invention are set forth in particular in the appended claims. The invention itself both as to structure and mode of operation, together with other objects and advantages thereof, will be best understood from the following detailed description of one embodiment of the invention when read in conjunction with the accompanying drawings, in which:

The invention is illustrated as applied to a high voltage compressed air circuit interrupter similar to the circuit interrupter disclosed in the copending application of Leon R. Ludwig et al., Serial No. 431,594, filed February 18, 1942, now Patent No. 2,394,086, issued February 5, 1946, and assigned to the assignee of the present invention. It is to be understood, however, that the improved valve mechanism of the present invention may be applied to any form of compressed gas circuit interrupter either as a blast valve mechanism or as a valve for controlling the fluid motor which operates the contact means.

Figure 1:
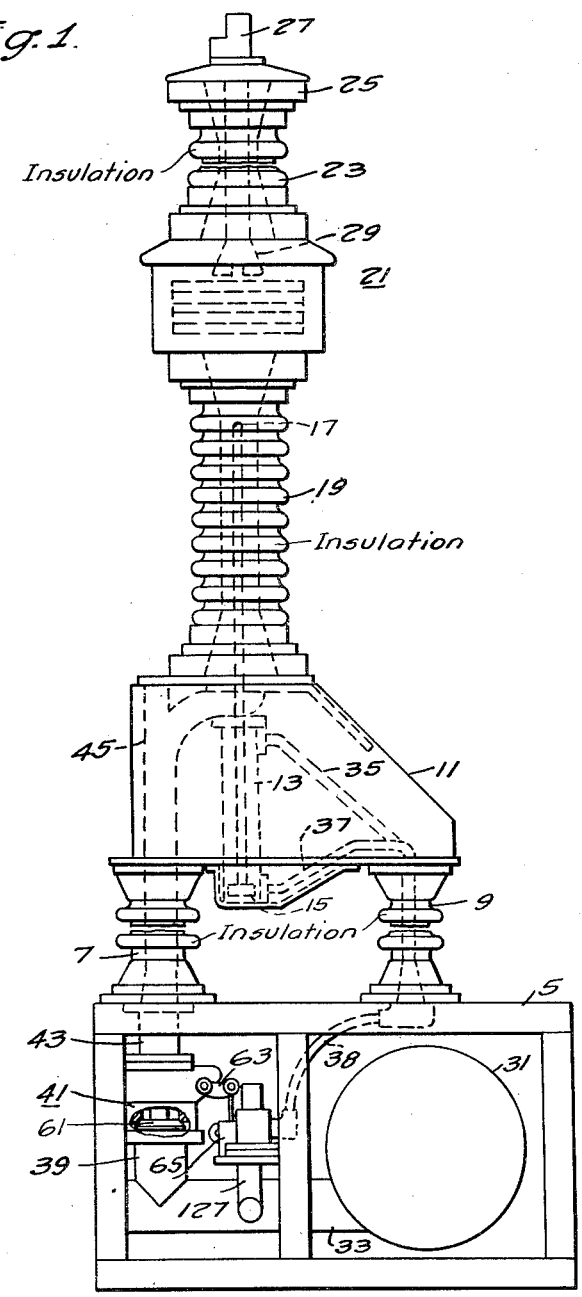
Figure 1 is a side elevational view of a compressed gas circuit interrupter embodying the improved valve mechanism of the invention.

Referring to Figure 1 of the drawings, the circuit breaker is mounted on a supporting frame 5 and is insulated therefrom by a plurality of hollow supporting insulators 7 and 9, only one of the insulators 9 appearing in this figure. A housing 11 mounted on the insulators 7 and 9 contains an operating cylinder 13 and piston 15 for actuating the movable contact member 17 to open and closed circuit position. The movable contact member 17 extends upwardly through a hollow insulator 19 into the chamber of an arc interrupting unit 21 secured on top of the insulator 19. A hollow insulator 23 mounted on top of the interrupting unit is closed at its upper end by a cap 25 having a terminal 27 thereon. A stationary contact member 29 supported by the cap 25 extends downwardly into the upper end of the chamber of the interrupting unit 21 for engagement by the movable contact member.

Fluid under pressure, in this instance, compressed air, for extinguishing the arc drawn by the contact members in the interrupting unit and for the operating means 13—15 is stored and maintained in a tank 31 mounted within the frame 5. A manifold 33 connected to the tank 31 forms the common air supply for both functions.

The opposite ends of the breaker operating cylinder 13 are connected through pipes 35 and 37, passages of insulators 9 and pipes 38 (only one of which is visible in Fig. 1), to the manifold 33. A pair of electromagnetically controlled valve mechanisms (not shown) are interposed between the pipes 38 and the manifold 33 for controlling the flow of opening and closing air to the cylinder 13 to control opening and closing operation of the circuit breaker.

Extending upwardly from the manifold 33 is a large diameter section of pipe 39 which communicates through a blast valve 41 and a short section of pipe 43 with the passage through the interior of the hollow insulator 7. The passage of this insulator communicates through a pipe 45 with the passage through the hollow insulator 19 which, in turn, connects with the chamber of the arc extinguishing unit 21. When the blast valve 41 opens, a blast of compressed air flows from the manifold 33 through pipes 39, 43, insulator 7, pipe 45 and insulator 19 into the arc extinguisher 21 where it quickly extinguishes the current arc drawn between the contacts 17 and 29.

When the circuit breaker is operated to open position the tip of the moving contact member 17 moves downwardly out of the extinguisher 21 and continues its movement some distance down into the space within the hollow insulator 19 so as to provide an isolating gap in series with the interrupting unit 21.

The circuit breaker also includes a series isolating switch (not shown) with a separate compressed air operating motor therefor which is pneumatically interlocked with the motor 13, 15 of the interrupter for sequence operation and controlled by the same opening and closing control valves, as disclosed in the aforementioned copending application of Leon R. Ludwig et al., Serial No. 431,394. The disconnecting switch and its operating means have not been illustrated and described in this application since it is unnecessary for a complete understanding of the present invention.

The blast valve 41 is arranged to be opened simultaneously with the opening control valve (not shown) so that a blast of air is directed to the contacts within the interrupting unit as soon as they begin to separate. The blast valve is preferably arranged to be closed immediately after the arc has been completely extinguished, in order to conserve compressed air.

Figure 2:
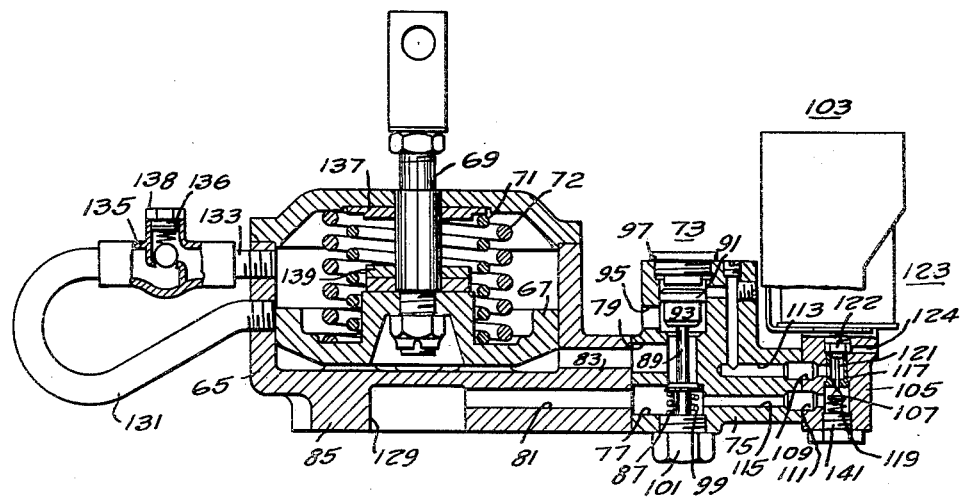
Fig. 2 is an enlarged sectional view of the improved valve operating mechanism.
Figure 3:
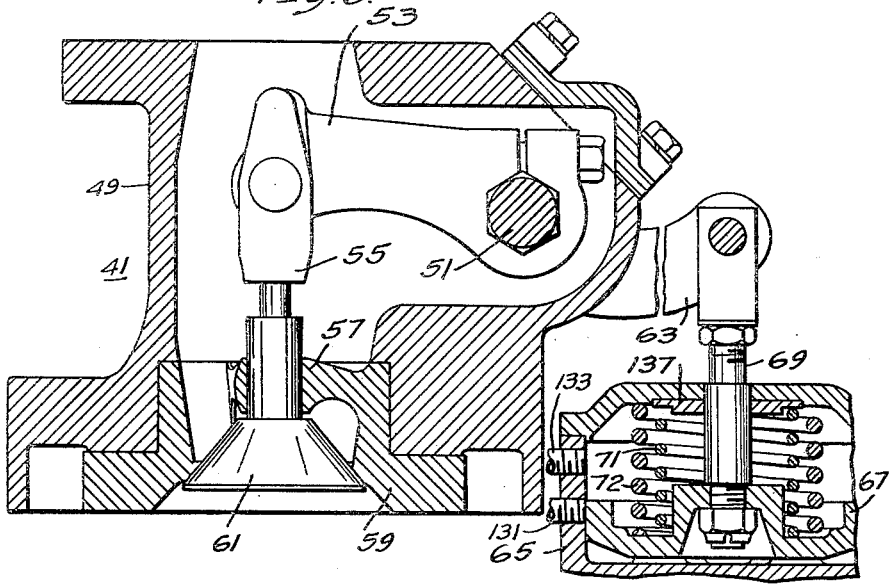
Fig. 3 is an enlarged sectional view of the valve assembly.

The blast valve mechanism of the present invention comprises the blast valve 41 of Fig. 1 which is shown in detail in Fig. 3 and the improved high speed operating means therefor which is shown in detail in Fig. 2 of the drawings.

Referring to Fig. 3, the blast valve 41 has a housing 49 which is removably mounted between and connected to the pipe sections 39 and 43 (Fig. 1). Extending through a side portion of the housing and journaled therein is a rock shaft 51 having a non-circular portion within the valve housing to which is secured a rocker arm 53. Pivotally connected to the rocker arm 53 within the valve housing is a valve spindle 55. A blast valve element 61 is connected to the lower portion of the spindle, and this valve element has a tubular portion which slides in a guide 57 formed integral with a valve seat 59 secured within the lower portion of the valve housing. The blast valve element 61 bears tightly against the valve seat in the closed position of the blast valve. A yoke shaped crank lever 63 is secured to the end portions of the rock shaft 51 on the outside of the valve housing, and this crank lever is pivotally connected to the valve operating mechanism which is shown in Fig. 2.

As has previously been pointed out, it is very important that the blast valve should open very quickly to its full open position in response to energization of its control electromagnet. It is also important that the blast valve should close very quickly upon deenergization of its control electromagnet and relay in order to prevent wastage of compressed air. A considerable operating force is required to quickly open the valve against the pressure of the supply air, and yet its operation must be initiated by relatively small force since the electrical control energy available for control of the valve is usually small. In accordance with the present invention, the blast valve is provided with an improved high speed operating mechanism which will open and close the valve very quickly and yet requires only a relatively small force to initiate the operation of the valve.

Referring to Fig. 2, the valve operating mechanism comprises an operating cylinder 65 and an operating piston 67 reciprocally movable therein which is operatively connected to the crank lever 63 of the blast valve by means of a connecting rod 69 extending through an opening in the top wall of the operating cylinder. A pair of concentrically arranged helical compression springs 71 and 72 are disposed within the operating cylinder between the operating piston and head of the cylinder. These springs encircle a portion of the connecting rod and serve to bias the valve operating piston 67 downwardly to its lower limiting position, thereby biasing the blast valve 61 to closed position.

The blast valve is adapted to be operated to open position by admitting compressed air into the lower end of the valve operating cylinder 65 beneath the valve piston 67. A relay valve assembly, indicated generally at 73, is provided for controlling the flow of compressed air to and from the valve operating cylinder 65. This relay valve 73 comprises a cast housing 75 having a pair of air passages 77 and 79 adapted to communicate, respectively, with cooperating passages 81 and 83 formed in the cylinder casting 85 of the operating cylinder 65. The relay valve includes an inlet valve element 87 which controls communication between the passages 77 and 79 to control the admission of compressed air into the lower end of the operating cylinder 65. The valve element 87 is mounted on a valve stem 89 to the top of which is secured an actuating piston 91. The piston 91 is movable in a cylinder provided in the relay valve housing, and the lower portion of the piston is formed to provide an exhaust valve 93 engageable with an exhaust valve seat at the upper end of the central passageway in the valve. An atmosphere exhaust port 95 is formed in the relay valve housing in communication with the cylinder portion containing the actuating piston 91. The exhaust valve portion 93 controls communication between the passageway 79 and the exhaust port 95. The opening in the cylinder portion above the actuating piston 91 is closed by the screw cap 97.

A helical compression spring 99 is disposed between the underside of the inlet valve element 87 and a screw plug 101 threaded in an opening in the valve housing immediately below the valve element 87. The spring 99 serves to bias the relay inlet valve element 87 to closed position against its seat. In this closed position of the inlet valve element 87, the actuating piston 91 is in its upper limiting position in which the exhaust portion 93 formed thereon is in open position.

The inlet valve element 87 of the relay is adapted to be quickly moved downwardly to open position by admitting compressed air into the upper end of the cylinder above the actuating piston 91. The compressed air drives the piston quickly downwardly, opening the inlet valve element 87, and closing the exhaust valve 93. Compressed air is thereupon admitted through the passages 81, 77, 79 and 83 into the lower end of the main blast valve operating cylinder 65 for actuating the blast valve piston 67 to open the blast valve 61.

Operation of the relay valve is controlled by an electromagnetically operated pilot valve assembly, indicated generally at 103. This pilot valve assembly comprises a small pilot valve housing 105 secured to one end of the relay valve housing 75. The housing 105 contains a pilot valve element 107 for controlling the flow of compressed air into the upper end of the relay valve actuating cylinder above the relay valve actuating piston 91. The pilot valve housing is provided with passages 109 and 111 which communicate, respectively, with cooperating passages 113 and 115 in the right-hand portion of the relay valve housing 75. The small pilot valve element 107 is biased to closed position against a valve seat 117 by a small helical compression spring 119 bearing against the underside of the pilot valve element. In this closed position the pilot valve shuts off communication between the passages 109 and 111. The valve element is secured to a valve spindle 121 which extends upwardly through an opening in the valve housing and connects to the movable armature (not shown) of a controlling electromagnet 123 mounted on top of the pilot valve housing. An exhaust valve element 122 on the spindle 121 is arranged to close an exhaust port 124 when the pilot valve element 107 is in open position as shown in Fig. 2, and to open the exhaust port 124 when the pilot valve element 107 is in closed position thereby discharging compressed air above the piston 91 and in the passage 113 to atmosphere. The pilot valve 107 is adapted to be moved downwardly to the open position shown in Fig. 2 upon energization of the electromagnet 123.

The passages 115 and 111 communicate with the main inlet passage 81 in the casting 85. This casting 85 is secured on the flange portion of a pipe section 127 (Fig. 1) which is in communication with the air manifold 33, the inlet passage 81 having an enlarged portion 129 which communicates directly with the supply pipe 127. The relay valve housing 75 is removably secured in proper position against the casting 85 by means of a plurality of cap screws (not shown).

The passages 77 and 79 and the inlet valve element 87 of the relay valve 73 are of relatively large size so that when the relay valve is open, a large quantity of compressed air is admitted into the lower end of the blast valve operating cylinder 65 to very quickly actuate the main blast valve to open position. The passages and pilot valve element of the pilot valve assembly are of smaller size, but such that they pass a sufficient quantity of compressed air to the top of the relay valve operating piston 91 upon opening of the pilot valve to quickly effect opening of the relay inlet valve 87. By providing the pneumatically operated relay valve 73 between the blast valve operating cylinder and the pilot valve, it is possible for the relatively small pilot valve to pass sufficient air to the top of the cylinder in the relay valve 73 to open the relay inlet valve 87 which, in turn, connects the pressure source to the region under the blast valve operating piston 67 through a passage which is many times larger than would have been possible by using the pilot valve alone for this purpose. By this method a large quantity of air is admitted to the blast valve operating piston under the control of a relatively small and light pilot valve which requires only a very small operating force. With this construction it was found possible to reduce the time required to obtain full opening of the blast valve to less than two cycles, where prior valve mechanisms required considerably more time to obtain full opening of the blast valve.

In addition to opening the blast valve quickly, it is also very important to close it quickly after interruption of the arc has been accomplished, and the control relay deenergized, because for every cycle that the blast valve remains open after deenergization of its control relay, a very considerable quantity of compressed air is unnecessarily wasted. The provision of the relatively large exhaust valve 93 and exhaust port 95 in the relay valve 73 quickly discharges the compressed air under the blast valve operating piston 67, thereby permitting very quick closing of the blast valve.

In order to close the blast valve quickly it would seem desirable to make the biasing springs 71 and 72 very heavy. However, it is apparent that this would detract from the speed with which the blast valve could be opened. Since the area of the blast valve operating piston 67 is quite large, we have found that even if a small air pressure could be applied to the top side of the operating piston 67, it would greatly facilitate the speed at which the blast valve could be closed. In accordance with the present invention, very high speed closing of the blast valve is obtained by providing means for automatically admitting a quantity of compressed air into the upper end of the operating cylinder 65 on the closing side of the valve operating piston 67 at the time the blast valve reaches full open position. This air is trapped in the upper end of the operating cylinder and very materially assists the biasing springs to drive the blast valve operating piston downwardly to quickly close the blast valve. This automatic admission of compressed air to the upper end of the valve operating cylinder 65 when the blast valve reaches open position is obtained by providing a by-pass passage consisting of a tube 131 and a pipe connection 133, connected to the wall of the blast valve operating cylinder 65, as shown in Fig. 2. The tube 131 is connected through the pipe section to the interior of the operating cylinder 65 at the upper end thereof, the lower end of the tube 131 being connected to the interior of the cylinder at an intermediate point. The points of connection of the tube to the operating cylinder are so disposed that when the blast valve 61 is in closed position and the piston is in its lowermost position, both openings of the tube connections into the cylinder are above the piston. When the blast valve reaches full open position and the operating piston 67 is at the upper end of its travel, the lower opening of the tube 131 into the cylinder is below and uncovered by the operating piston 67, and the upper connection of the tube is disposed above the piston. Thus, after the blast valve has been completely opened, compressed air passes from the cylinder space below the piston into the space at the upper end of the cylinder 65 above the piston, and the pressure in the upper end of the piston becomes almost equal to the pressure below the piston. When the blast valve is in this open position, very little force is necessary to hold it open, and it is, therefore, possible to almost equalize the force above and below the blast valve operating piston. A check valve 135 is interposed between the tube 131 and the pipe connection 133 to keep the compressed air admitted to the upper end of the operating cylinder 65 from flowing back into the lower end of the cylinder below the piston. A spring 136 is provided for biasing the check valve 135 to closed position and this spring serves to control the pressure above and below the main operating piston 67 when the blast valve 61 is in open position. The spring is adjustable by means of a screw plug 138. Thus by means of the spring 136 and screw plug 138 the differential pressure on the main piston may be adjusted to the desired value. The air trapped above the operating piston 67 by the check valve after the piston reaches the upper end of its travel serves to give the operating piston 65 a large accelerating force toward closed position to quickly close the blast valve 61 upon deenergization of the electromagnet 123 and discharge of compressed air below the blast valve operating piston 67 to atmosphere through the exhaust port 79 of the relay valve.

The operation of the blast valve mechanism is briefly as follows: Opening operation of the blast valve is initiated in response to energization of the electromagnet 123. Upon energization of the electromagnet 123, the pilot valve 107 is moved to open position, thereby admitting compressed air from the manifold 33 through the passages 81, 77, 111 and 113 to the top of the relay valve operating piston 91. Compressed air moves the valve actuating piston 91 downwardly, effecting opening of the inlet valve element 87 of the relay valve 73, and at the same time closing the exhaust valve element 93. A large quantity of compressed air is thereupon admitted through the passages 81, 77 and 83 into the lower end of the blast valve operating cylinder 65 beneath the piston 67. Since the piston 67 is of relatively large diameter, it is driven at high speed to the upper end of its travel, thereby effecting quick opening of the blast valve 61 to its full open position. When the blast valve reaches full open position and the piston 67 is at the upper end of its travel, the opening of the tube 131 into the intermediate portion of the cylinder 65 is uncovered by the piston and compressed air from the cylinder space below the piston passes through the tube 131 pressure regulating and check valve 135 into the upper end of the cylinder 65 above the piston, filling the space above the piston to a pressure almost equal to the pressure below the piston. The parts remain in this position until the electromagnet 123 is deenergized by its control relay. Upon deenergization of the electromagnet 123, the pilot valve 107 is returned to closed position, and the relay valve actuating piston 91 is thereupon moved upwardly by the spring 99 to close the inlet valve element 87 and open the exhaust valve element 93. The compressed air in the cylinder space below the blast valve operating piston 67 is thereupon quickly discharged to atmosphere through the dump valve 93 and exhaust port 95 of the relay valve. The compressed air trapped above the blast valve operating piston 67, aided by the springs 71, 72, thereupon quickly moves the piston 67 downwardly to the lower end of its travel, effecting high speed closing of the blast valve 61.

A bumper 137 is provided on the top wall of the cylinder 65, and a resilient bumper 139 is carried by the central portion of the blast valve operating portion 67 to absorb the kinetic energy of the moving parts at the end of the opening movement of the blast valve.

The screw plugs 97 and 101 provide access to the movable parts of the relay valve to permit removal and replacement thereof. A screw plug 141 is also provided for the pilot valve assembly to permit access to be had to the pilot valve 107 and its spring 119.

In some designs it may be permissible to eliminate the relay valve assembly 73 and connect the pilot valve assembly directly to the fluid motor of the blast valve for controlling the flow of compressed air to the operating cylinder 65. In this instance, however, opening and closing of the blast valve will not be effected as quickly as when the intermediate relay valve is utilized.

While the invention has been disclosed in accordance with the provisions of the patent statutes, it is to be understood that various changes may be made in the construction without departing from some of the essential features of the invention. It is desired, therefore, that the language of the appended claims should be construed as broadly as possible in the light of the prior art.

We claim as our invention:

1. In a compressed gas circuit interrupter, a high-speed valve mechanism for controlling the flow of compressed gas to the interrupter comprising a valve movable to open and to closed positions, a piston operatively related to said valve and working in a cylinder, means for admitting compressed gas to one end of said cylinder to effect high-speed operation of said piston and valve to open position, and means comprising a by-pass passage communicating with said cylinder and opened by said piston when said valve reaches open position for admitting compressed gas to the other end of said cylinder to operate said piston and valve to closed position.

2. A valve mechanism for controlling flow of compressed gas to a circuit interrupter mechanism comprising, a valve element movable to open and to closed position, a piston connected to said valve element, a cylinder in which said piston is movable, means for admitting compressed gas into one end of said cylinder to effect opening of said valve element, and means comprising a by-pass passage communicating with said cylinder and opened by said piston adjacent the end of its travel in valve opening direction for admitting compressed gas from said one end of said cylinder into the other end of said cylinder.

3. A valve mechanism for controlling flow of compressed gas to a circuit interrupter mechanism comprising, a valve element movable to open and to closed position, a piston connected to said valve, a cylinder in which said piston is reciprocally movable, means for admitting compressed gas into one end of said cylinder to effect opening operation of said valve element, a by-pass passage communicating with said cylinder and disposed to be uncovered by the piston adjacent the end of its travel in valve opening direction to admit compressed gas from said one end of the cylinder into the other end, and a check valve in said passage.

4. A valve mechanism for controlling flow of compressed gas to a circuit interrupter mechanism comprising a main valve element movable to open and to closed position, an operating cylinder, a piston in said cylinder operatively connected to said valve element, means for admitting compressed gas into one end of said cylinder to effect opening of said main valve element, a spring biasing said main valve element to closed position, and a by-pass passage communicating with said cylinder disposed to be uncovered by said piston during its travel in valve opening direction to admit compressed gas into the other end of said cylinder to operate said main valve to closed position.

5. A valve mechanism for controlling flow of compressed gas to a circuit interrupter comprising, a main valve movable to open and to closed position, an operating cylinder, a piston in said cylinder connected to said main valve, means for admitting compressed gas into one end of said cylinder to effect movement of said piston to open the main valve, a by-pass passage in communication with said cylinder disposed to be uncovered by said piston adjacent the end of its travel to admit compressed gas into the other end of said cylinder, a check valve in said passage, and a passage for exhausting compressed gas from said one end of the cylinder and thereby cause the compressed gas admitted through the by-pass to the other end of the cylinder to aid in moving the piston to close the main valve.

6. A high speed valve mechanism for controlling flow of compressed gas to a circuit interrupter comprising, a main valve movable to open and to closed position, an operating cylinder, a piston in said cylinder connected to said valve, a passage for admitting compressed gas into one end of said cylinder to effect high speed movement of said piston to open said main valve, an exhaust passage for discharging compressed gas from said one end of the cylinder and thereby allow said main valve to close, a spring biasing said main valve to closed position, a by-pass passage in communication with said cylinder disposed to be uncovered adjacent the end of the valve opening travel of the piston to admit compressed gas to the other end of said cylinder to operate said main valve to closed position upon opening of said exhaust passage, and a check valve in said by-pass passage.

7. A high speed valve mechanism for controlling flow of compressed gas to a circuit interrupter comprising, a main valve movable to open and to closed position, an operating cylinder, a piston in said cylinder connected to said valve, a relatively large inlet passage for quickly admitting compressed gas into one end of said cylinder to effect high speed operation of said piston to open said main valve, an exhaust passage for quickly discharging compressed gas from said one end of said cylinder to allow quick closing of said main valve, spring means biasing said main valve to closed position, a by-pass passage communicating with said cylinder disposed to be uncovered by said piston adjacent the end of the valve opening travel thereof for admitting compressed gas from said one end of the cylinder into the other end thereof, and a check valve in said by-pass passage operable to cause said compressed gas to quickly operate said piston and valve to closed position upon opening of the exhaust passage.

8. A valve mechanism for controlling flow of compressed gas to a circuit interrupter mechanism comprising, a valve element movable to open and to closed position, a piston connected to said valve, a cylinder in which said piston is reciprocally movable, means for admitting compressed gas into one end of said cylinder to effect opening operation of said valve element, a by-pass passage communicating with said cylinder and disposed to be uncovered by the piston at a point near the end of its travel in valve opening direction to admit compressed gas from said one end of the cylinder into the other end of said cylinder, a check valve in said passage to prevent return flow of compressed air through said passage to thereby cause the compressed air admitted through said by-pass passage to quickly operate said piston and valve to closed position, and adjustable spring means biasing said check valve to closed position.

9. A valve mechanism for controlling flow of compressed gas to a circuit interrupter mechanism comprising, a valve element movable to open and to closed position, a piston connected to said valve element, a cylinder in which said piston is movable, means for admitting compressed gas into one end of said cylinder to effect opening of said valve element, means comprising a by-pass passage communicating with said cylinder and opened by said piston adjacent the end of its travel in valve opening direction for admitting compressed gas into the other end of said cylinder, valve means disposed in said by-pass passage, and means biasing said valve means to provide differential gas pressure in said ends of said cylinder.

10. A valve mechanism for controlling flow of compressed gas to a circuit interrupter comprising, a main valve movable to open and to closed positions, an operating cylinder, a piston in said cylinder connected to said valve, a passage for admitting compressed gas into one end of said cylinder to open said main valve, a by-pass passage in communication with said cylinder disposed to be uncovered by said piston adjacent the end of the valve opening travel to admit compressed gas to the other end of said cylinder, a check valve in said by-pass passage to prevent return flow of gas from said other end of the cylinder, means biasing said check valve to control the flow of compressed gas to said other end of the cylinder, and an exhaust passage effective when open to quickly discharge the compressed gas from said one end of said cylinder to thereby cause the compressed gas admitted through said by-pass at the other end of the cylinder to operate the piston and said main valve to closed position.

BENJAMIN P. BAKER.
HERBERT J. WEBB.